(12) United States Patent
Zhang et al.

(10) Patent No.: US 9,151,382 B2
(45) Date of Patent: Oct. 6, 2015

(54) GROSS SLIP-BASED CONTROL OF A VARIATOR ASSEMBLY

(71) Applicant: GM GLOBAL TECHNOLOGY OPERATIONS LLC, Detroit, MI (US)

(72) Inventors: Zhen J. Zhang, West Bloomfield, MI (US); Jesse B. Bradley, Royal Oak, MI (US); Jing Zhou, Auburn Hills, MI (US); John E. Marano, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 47 days.

(21) Appl. No.: 14/187,365

(22) Filed: Feb. 24, 2014

(65) Prior Publication Data

US 2015/0240941 A1    Aug. 27, 2015

(51) Int. Cl.
*F16H 61/12* (2010.01)
*F16H 61/662* (2006.01)
*B60W 10/107* (2012.01)

(52) U.S. Cl.
CPC .......... *F16H 61/66272* (2013.01); *F16H 61/12* (2013.01); *B60W 10/107* (2013.01); *F16H 2061/66277* (2013.01); *F16H 2061/66295* (2013.01); *Y10T 477/6237* (2015.01)

(58) Field of Classification Search
CPC .............. F16H 61/66272; F16H 61/12; F16H 61/6629; F16H 2061/66295; F16H 2061/66277; B60W 10/101; B60W 10/107; Y10T 477/6237

USPC ......... 701/51, 58, 61; 477/37, 44, 45, 50, 906
See application file for complete search history.

(56) References Cited

U.S. PATENT DOCUMENTS

| | | | |
|---|---|---|---|
| 5,382,205 A * | 1/1995 | Togai et al. | 477/43 |
| 2005/0221930 A1* | 10/2005 | Oshita et al. | 474/28 |
| 2005/0221949 A1* | 10/2005 | Oshita et al. | 477/48 |
| 2008/0153665 A1* | 6/2008 | Uchiyama | 477/49 |
| 2009/0204285 A1* | 8/2009 | Matsui et al. | 701/29 |
| 2009/0319144 A1* | 12/2009 | Tanaka et al. | 701/61 |
| 2010/0228450 A1* | 9/2010 | Takahashi et al. | 701/51 |
| 2012/0135829 A1* | 5/2012 | Doihara et al. | 474/28 |

FOREIGN PATENT DOCUMENTS

WO    WO03027540 A1 *  4/2003

\* cited by examiner

*Primary Examiner* — Roger Pang
(74) *Attorney, Agent, or Firm* — Quinn Law Group, PLLC

(57) ABSTRACT

A vehicle includes an engine, drive wheels, a continuously variable transmission (CVT), and a controller. The CVT includes an input member connected to the engine, an output member delivering output torque to the wheels, and a variator assembly connecting the input and output members. The controller determines, via a method, an input and output speed of the variator assembly, converts the output speed to an equivalent input speed using a calibrated variator speed ratio, and calculates a gross slip of the variator assembly using the input and equivalent input speeds. A gross slip flag is set only when the gross slip exceeds a calibrated slip value for a predetermined duration. A CVT assembly includes the controller, input and output members, and variator assembly. The variator assembly may include drive and driven pulleys, a drive mechanism connecting the pulleys, and an actuator applying a clamping force to one of the pulleys.

20 Claims, 3 Drawing Sheets

GROSS SLIP-BASED CONTROL OF A VARIATOR ASSEMBLY

TECHNICAL FIELD

The present disclosure relates to gross slip-based control of a variator assembly.

BACKGROUND

A continuously variable transmission (CVT) can change steplessly through an infinite number of transmission torque ratios between and inclusive of a calibrated maximum and a minimum transmission torque ratio. A typical CVT includes a variator assembly having two pulleys, i.e., a drive pulley and a driven pulley. A belt or other drive mechanism is disposed between sheaves of both of the pulleys. Other CVT designs may use conical rollers in lieu of a belt. Frictional engagement of the belt with the sheaves transfers torque from the drive pulley to the driven pulley, with the drive pulley being connected to an input member of the CVT and the driven pulley being connected to an output member.

The transmission torque ratio of a CVT is the ratio of an amount of torque carried by the driven pulley to an amount of torque carried by the drive pulley. The transmission torque ratio may be varied by moving the sheaves of a designated one of the pulleys closer together, while at the same time moving the sheaves of the other pulley farther apart. Movement in this manner causes the belt to ride higher or lower on the respective pulleys. As the vehicle accelerates, the spacing of the sheaves may be varied. Proper diagnostics of a variator assembly in a CVT may help to ensure optimal ongoing performance of the CVT.

SUMMARY

A vehicle is disclosed herein that, in an example embodiment, includes an engine, a continuously variable transmission (CVT), and a controller. The CVT includes a variator assembly of the type noted above, with the variator assembly selectively coupling input and output members of the CVT to vary the transmission torque ratio. The controller, via execution of instructions or computer-readable code, determines a gross slip of the variator assembly in a particular manner, and then takes necessary control actions whenever a calibrated threshold amount of gross slip is present for a predetermined duration.

Under steady-state drive conditions, a constant calibration threshold for variator slip may be used in a conventional manner. However, a ratio change of a CVT does not occur instantaneously. A quantifiable delay may occur. Using a constant calibration threshold during a ratio change of a CVT in the conventional manner may at times result in the setting of a variator gross slip flag or other diagnostic action when such a flag or action is not warranted. The present approach thus helps in determining whether or not such a diagnostic control action is indeed warranted.

Gross slip may be determined in one of two related manners as set forth herein. Both ways include determining the respective actual input and output speeds of the variator assembly, e.g., via direct measurement using input and output speed sensors or encoders. The actual output speed is then converted to an equivalent input speed by dividing the actual output speed by a calibrated variator speed ratio. The calibrated variator speed ratio may be embodied in different ways depending on the embodiment, i.e., (I) as a commanded speed ratio, or (II) as a speed ratio profile determined offline, e.g., using the commanded speed ratio, the current speed ratio, and a desired ratio change rate. The variator gross slip is then calculated as the difference between the actual input speed and the calculated equivalent input speed. If the calculated variator gross slip exceeds a calibrated slip value for a predetermined duration, a variator gross slip flag may be set. A corresponding control action may be taken thereafter by the controller as needed.

The vehicle may include an engine or other prime mover, drive wheels, a CVT, and a controller in another embodiment. The CVT has an input member that is selectively connected to the engine, an output member that delivers output torque to the drive wheels, and a variator assembly connecting the input member to the output member. The controller is programmed to execute instructions and thereby calculate the variator gross slip in the manner noted above. The calculated variator gross slip is compared to the calibrated slip value, and a variator gross slip flag may be set when the calculated variator gross slip exceeds the calibrated slip value for a predetermined duration.

A CVT assembly is also disclosed. The CVT assembly in a possible embodiment may include an input member, an output member, a variator assembly, and a controller. The variator assembly, which connects the input member to the output member, includes a drive pulley, a driven pulley, a drive mechanism connecting the drive pulley to the driven pulley, and an actuator. The actuator is operable to selectively apply a clamping force to one of the drive or driven pulleys. The controller determines a speed of the drive and driven pulleys of the variator assembly, converts the measured driven pulley speed to an equivalent drive speed, and divides the driven speed by a calibrated variator speed ratio, i.e., a commanded variator speed ratio or a profile of such a commanded ratio as explained above. Variator gross slip, i.e., the difference between the actual drive member speed and the calculated equivalent drive member speed, is the variator gross slip. This calculated value is compared to a calibrated slip value and a predetermined duration, with the noted control actions being executed when the variator gross slip exceeds the calibrated slip value for the duration.

Additionally, an associated method is disclosed for calculating the variator gross slip and selectively activating a variator gross slip flag in a vehicle. The method may include determining, via a controller of a vehicle having a CVT, an actual input speed and an actual output speed of a variator assembly of the CVT. The method may also include calculating an equivalent input speed of the variator assembly by dividing the measured actual output speed by a calibrated variator speed ratio, determining the gross variator slip using the measured actual input speed and the equivalent input speed, and setting a variator gross slip flag in the memory of the controller only when the determined gross variator slip exceeds a calibrated slip value for a predetermined duration.

The above features and advantages and other features and advantages of the present invention are readily apparent from the following detailed description of the best modes for carrying out the invention when taken in connection with the accompanying drawings.

DETAILED DESCRIPTION

Figure 1:
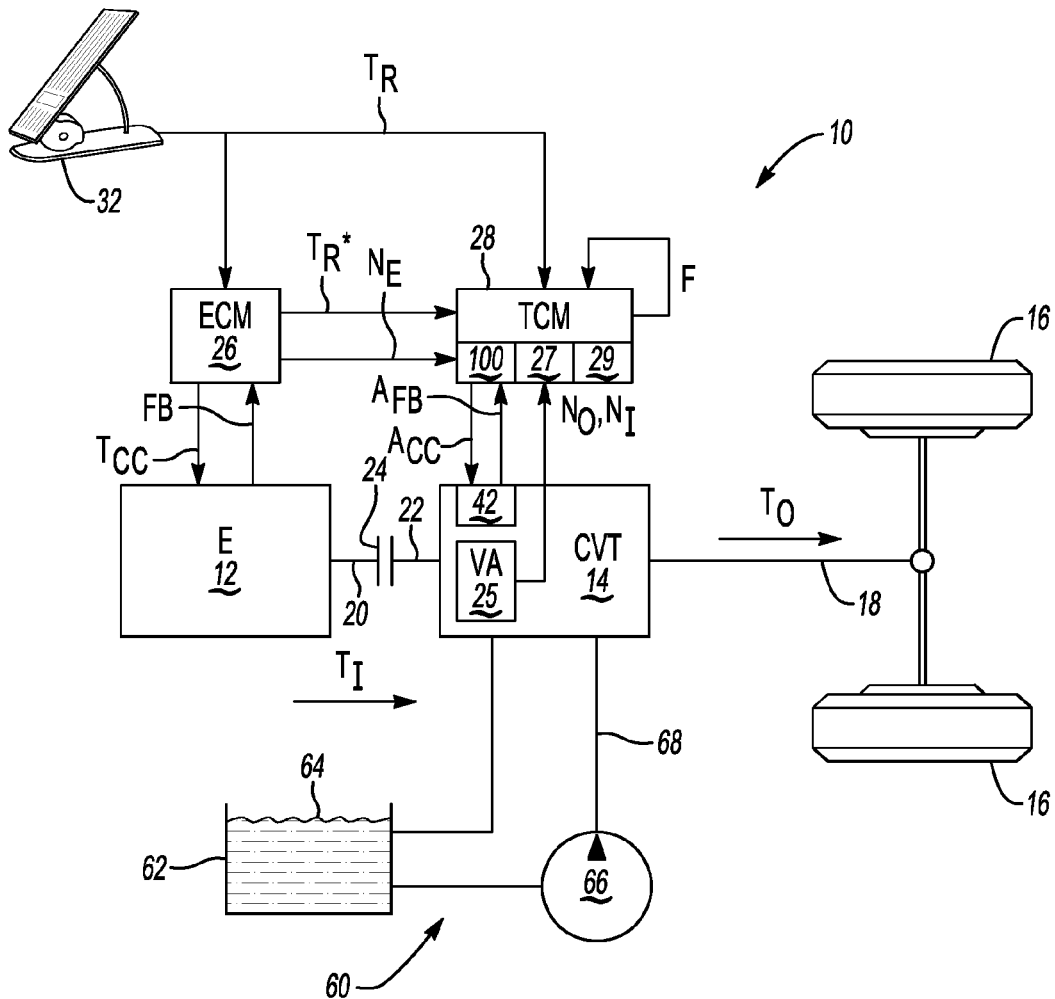
FIG. 1 is a schematic system diagram of a vehicle employing a continuously variable transmission (CVT) with a variator assembly, and a controller which executes a variator gross slip-based control method for the CVT.

Referring to the drawings, wherein like reference numerals are used to identify like or identical components in the various views, FIG. 1 schematically illustrates a vehicle 10. The vehicle 10 may include an internal combustion engine (E) 12 having an output shaft 20. The engine 12 may be embodied as a gasoline or diesel engine of the type known in the art, and/or an electric fraction motor or other suitable prime mover. The vehicle 10 also includes a continuously variable transmission (CVT) 14 that receives an input torque (arrow $T_I$) from the engine 12 and selectively delivers an output torque (arrow $T_O$) to a set of drive wheels 16 via an output member 18, thereby propelling the vehicle 10.

The output shaft 20 of the engine 12 may be selectively coupled to an input member 22 of the CVT 14 via an input device 24, for instance an input clutch or a hydrodynamic torque converter. As will be discussed in detail below, the CVT 14 also includes a variator assembly (VA) 25 that couples the input member 22 to the output member 18 at a given transmission torque ratio.

The example CVT 14 of FIG. 1 is characterized by a torque or speed ratio that relates the rotation of the input member 22 to the rotation of the output member 18. However, unlike fixed-torque transmissions having one or more static transmission torque ratios, the transmission torque ratio of the CVT 14 is continuously variable between a predefined minimum and maximum value. An example embodiment of the variator assembly 25 is described below with reference to FIG. 2. Gross slip of the variator assembly 25 may be determined according to a method 100, an example of which is shown in FIG. 3 and described below with additional reference to FIG. 4, with automatic control actions taken as needed based on the determined amount of gross slip and its duration.

Operation of the engine 12 of FIG. 1 may be controlled by an engine control module (ECM) 26, while the operation of the CVT 14 may be controlled by a transmission control module (TCM) 28. The ECM 26 and TCM 28 may be embodied as controllers in the form of one or multiple digital computers. Each of the ECM 26 and TCM 28 may be configured to automatically perform one or more control/processing routines that may be embodied as software or firmware, with the TCM 28 executing, via a processor (P) 27, instructions from tangible, non-transitory memory (M) 29 encoding the method 100. Memory 29 may include, by way of example, sufficient amounts of non-volatile read only memory (ROM), whether optical and/or magnetic memory, flash memory, electrically-erasable programmable read only memory (EEPROM), or otherwise. Transitory memory such as random access memory (RAM) may also be used as needed, along with a high-speed clock, analog-to-digital (A/D) and/or digital-to-analog (D/A) circuitry, input/output (I/O) circuitry, signal conditioning and buffering electronics, and the like. As a result of execution of the method 100, the TCM 28 may ultimately record a diagnostic code or set a flag (arrow F) to indicate an unacceptably high level of gross slip of the variator assembly 25 over a predetermined duration as explained below.

The ECM 26 of FIG. 1 may receive a torque request (arrow $T_R$) from a throttle device 32 such as an accelerator pedal, and may provide one or more torque commands (arrow $T_{CC}$) to the engine 12 in response. The ECM 26 may also communicate engine speed (arrow $N_E$) to the TCM 28. The torque commands (arrow $T_{CC}$) may include, for example, commands to increase or decrease the amount of fuel and/or air provided to the engine 12, spark retardation commands, and/or an amount of torque to be produced. In response to the torque commands (arrow $T_{CC}$), the engine 12 may produce a corresponding engine torque as an input torque (arrow $T_I$) to the input member 22. Additionally, the engine 12 may provide a set of feedback signals (arrow FB) to the ECM 26 that describes the current operating state of the engine 12. Feedback signals (arrow FB) may include, for example, an indication of the current torque and/or rotational speed of the output shaft 20, whether calculated or measured via an input speed sensor such as the input speed sensor $S_I$ shown in FIG. 2.

Figure 2:
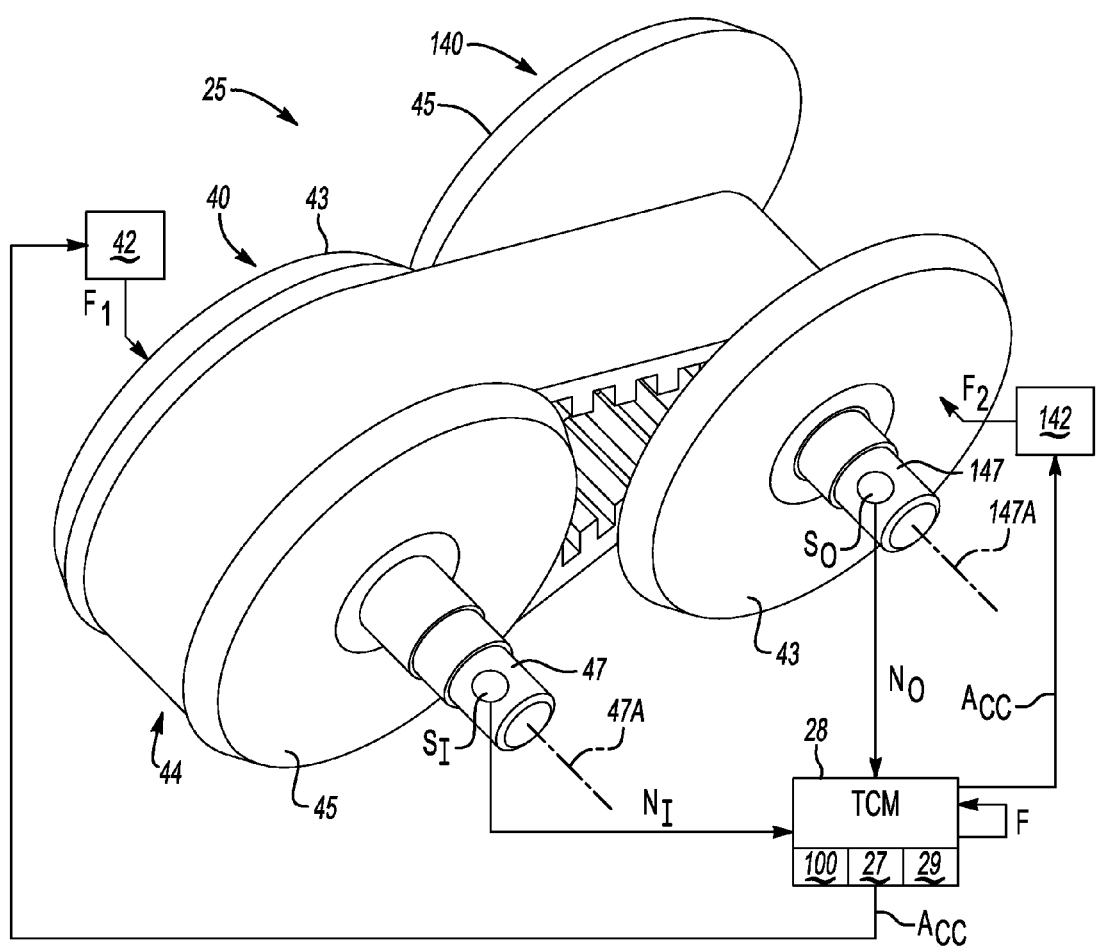
FIG. 2 is a schematic isometric view of an example variator assembly for the vehicle of FIG. 1.
Figure 3:
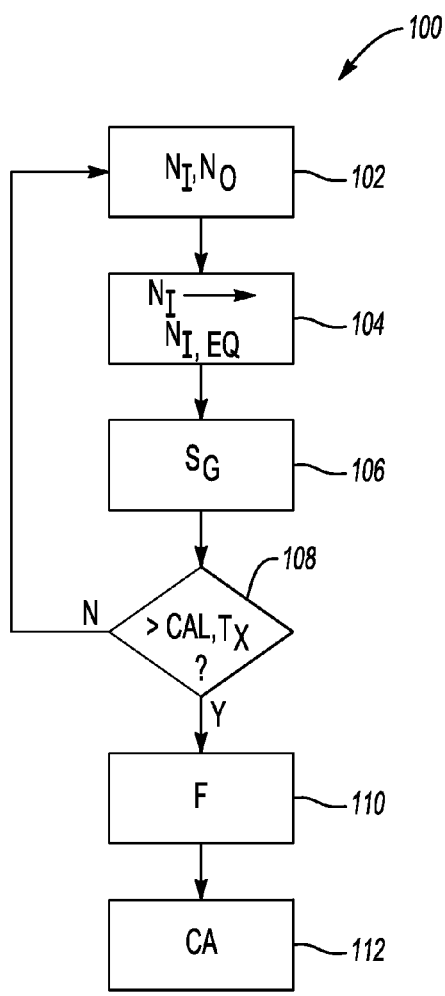
FIG. 3 is a schematic flow chart of an embodiment of the variator slip-based control method noted above.

The TCM 28 shown in FIG. 1 may be programmed to determine and command a desired torque/transmission torque ratio based on a received indication (arrow TR*) of the torque request (arrow $T_R$) from the ECM 26, and a received indication of a current rotational speed of the output member 18, e.g., from an output speed sensor ($S_O$) as shown in FIG. 2. The TCM 28 may then provide one or more actuator control signals (arrow $A_{CC}$) to one or more pulley actuators 42 of the CVT 14, e.g., linear or rotary actuators, so as to modify the effective torque/transmission torque ratio according to a determined desired torque/transmission torque ratio.

In one possible configuration, control of the pulley actuators 42 may be enacted by closed-loop control, whereby the pulley actuators 42 may provide one or more actuator feedback signals (arrow $A_{FB}$) to the TCM 28 indicative of the current operating state of the pulley actuators 42. Control may further be based on output and input speed signals, e.g., $N_O$ and $N_I$ from the output and input sensors $S_O$ and $S_I$ of FIG. 2, respectively, as well as other input signals such as vehicle speed, engine speed, position or apply level of the throttle device 32, etc. The CVT 14 may be cooled, and/or the actuators 42 actuated by, a fluid system 60 having a supply of fluid 64 delivered from a sump 62, which may be circulated to the CVT 14 via a pump 66 and a fluid conduit 68. For illustrative simplicity, control valves and the like are omitted from FIG. 1. However, such components are well understood in the art.

Referring to FIG. 2, a possible configuration of the variator assembly 25 is shown for the CVT 14 of FIG. 1. The variator assembly 25 may include a first pulley 40 and a second pulley 140. In the embodiment of FIG. 1, for example, the first pulley 40 may be coupled with the input member 22 of FIG. 1 via a first pulley axle 47, and may generally be referred to as a drive pulley. The second pulley 140 may be coupled with the output member 18 of FIG. 1 via a second pulley axle 147, and may generally be referred to as a driven pulley 140.

In one possible configuration, the structure and operation of the first pulley 40 and the second pulley 140 may be similar, and thus the respective first and second pulleys 40 and 140 may have essentially the same components. In addition to the respective first and second pulleys 40, 140, the variator assembly 25 may include a drive belt 44, or alternatively a chain or other suitable endless drive device. The belt 44 rotatably couples the first pulley 40 to the second pulley 140 such that rotation of the first pulley 40 causes a rotation of the second pulley 140.

Each of the first pulley 40 and the second pulley 140 may include a moveable first pulley portion/sheave 43, a stationary second pulley portion/sheave 45, and the first or second pulley axle 47, 147, respectively. The pulley axles 47,147 may be shafts or pins as shown, and each may be disposed along a respective longitudinal axis 47A, 147A. The first pulley portion 43 and the second pulley portion 45 may each rotate about their respective longitudinal axes 47A, 147A in unison with their respective axles 47, 147. The first pulley portion 43 may be capable of controllably translating along the first pulley axle 47 while the second pulley portion 45 may be fixed to the second pulley axle 147. Thus, the first pulley portion 43 can move toward and away from the second pulley portion 45. As such, the first pulley portion 43 may be referred to as a movable sheave, and the second pulley portion 45 may be referred to as a fixed sheave.

First and second pulley actuators 42, 142 are operatively coupled to the respective first and second pulleys 40, 140 such that each of the first and second pulley actuators 42, 142, e.g., a hydraulic piston or linear actuator, is configured to apply a respective clamping force $F_1$ or $F_2$ to the movable sheave/first portions 43 of the first and second pulleys 40, 140 so as to translate the movable sheaves 43 relative to the fixed sheave/second portions 45. The first and second pulley actuators 42, 142 may include electric motors, ball screws, drive screws, solenoids, hydraulics, pneumatics, and/or any other actuators capable of imparting a linear/nonlinear translation to the first pulley portion 43, as is well known in the art.

Figure 4:
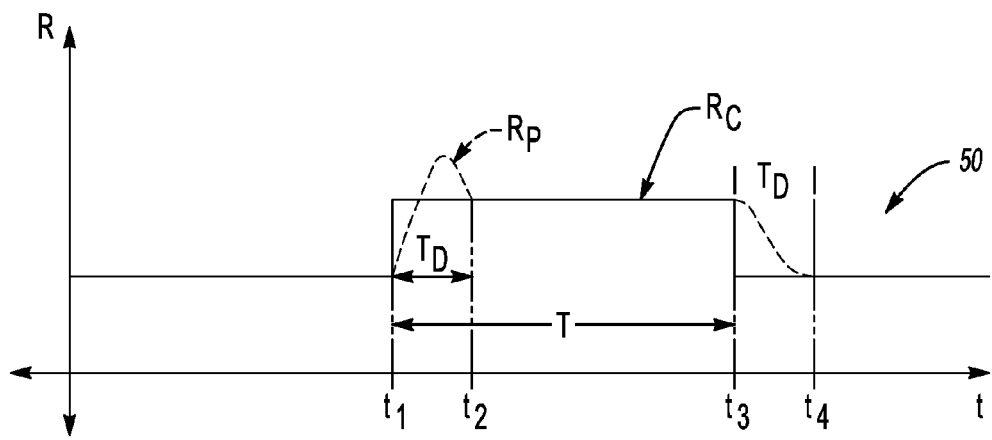
FIG. 4 is a time plot of example simulated and commanded transmission shift ratios usable as part of the present control method.

The speed sensors $S_I$, $S_O$ noted above are configured to measure the respective actual input and output pulley speeds ($N_I$, $N_O$) of the variator assembly 25 and transmit the same to the TCM 28 for processing during execution of the method 100 of FIG. 4. While shown schematically for simplicity as being connected to the pulley axles 47, 147 of the variator assembly 25, the respective input and output speed sensors $S_I$, $S_O$ could also be positioned external to the variator assembly 25, e.g., to any structural element that rotates in conjunction with the pulleys 40, 140 and thus can provide the input and output speeds ($N_I$, $N_O$).

As part of the method 100, the TCM 28 may selectively trigger activation of the variator gross slip flag (arrow F). In response to this action, the TCM 28 may execute a control action with respect to operation of the CVT 14 of FIG. 1 or the variator assembly 25 of FIG. 2. Method 100 is therefore intended to accurately determine precisely when the variator gross slip flag (arrow F) is required, which in turn can help protect the variator assembly 25 while improving overall control stability of the CVT 14 of FIG. 1.

Referring to FIG. 3, an example embodiment of the method 100 begins with step 102. The input and output speeds ($N_I$, $N_O$) are determined by the TCM 28, with the speeds ($N_I$, $N_O$) being the measured pulley speeds of the variator assembly 25 shown in FIG. 2. Step 102 may entail measuring the rotational speeds of the driving and driven sides of the variator assembly 25 of FIG. 2, i.e., the input and output speeds of the variator assembly 25 of FIG. 2, for instance using the respective input and output sensors $S_I$, $S_O$ of FIG. 2. The method 100 proceeds to step 104 once the actual input and output speeds to the CVT 14 and the variator assembly 25 are known.

Step 104 may entail converting the measured output speed ($N_O$) from step 102 into an equivalent input speed ($N_{I, EQ}$). Step 104 entails dividing the measured output speed ($N_O$) by a calibrated variator speed ratio ($R_{CAL}$), i.e., $N_{I,EQ}=N_O/R_{CAL}$. The calibrated variator speed ratio ($R_{CAL}$) may be determined in two ways: (I) as a commanded variator speed ratio, i.e., the ratio requested by the TCM 28 in response to a requested shift, or (II) as a calibrated profile, e.g., as a function of the commanded variator speed ratio, the current variator speed ratio which is known from the speeds measured in step 102, and a desired or calibrated ratio change rate, which is the allotted time for completing the requested ratio change as determined by logic of the TCM 28. Once the equivalent input speed ($N_{I, EQ}$) has been determined, this value may be temporarily recorded in memory 29 of FIG. 1. The method 100 then proceeds to step 106.

Referring briefly to FIG. 4, a set of time traces 50 depicts an example commanded variator torque ratio (trace $R_C$) from the TCM 28 and a variator torque ratio profile (trace $R_P$). The commanded variator torque ratio (trace $R_C$) may be determined by the TCM 28 based on the operating parameters of the vehicle 10, as is well known in the art. That is, the TCM 28 may consider engine speed, output torque (arrow $T_O$ of FIG. 1) from the CVT 14, requested output torque via the throttle device 32, e.g., position or travel, and the like to determine an optimum transmission ratio. The TCM 28 can then command this ratio via actuator control signals (arrow $A_{CC}$), in response to which the pulley actuators 42, 142 of FIG. 2 apply or release the clamping forces (arrow $F_1$, $F_2$). The commanded variator ratio (trace $R_C$) may be a square wave signal of duration T as shown in FIG. 4, which is initiated at $t_1$ and which continues until $t_3$.

FIG. 4 also shows a calibrated torque ratio profile (trace $R_P$) for the CVT 14. Such a calibrated value may be determined offline, for instance via modeling and testing of a given CVT under controlled conditions. That is, each CVT such as the example CVT 14 of FIG. 2 may transition between torque ratios in a different manner. The actual trajectory of the changing torque ratio is thus captured offline as opposed to using the ratio that is commanded. Slip can be observed, and the length of slip that is experienced in transitioning to a new torque ratio can be determined.

That is, a transient delay occurs in responding to the commanded torque ratio change at $t_1$. This is illustrated in FIG. 4 via the rise in the duration $t_1$-$t_2$ and the subsequent drop between $t_3$ and $t_4$. The rise represents slip, but this slip is expected and transient. The present method 100 is thus intended to ensure that a variator gross slip flag is not set by the TCM 28 of FIGS. 1 and 2 unless the variator slip extends beyond the predetermined duration ($T_D$) of the delay shown in FIG. 4.

Referring again to FIG. 3, at step 106 the TCM 28 next calculates the gross slip ($S_G$) as a function of the measured input speed (NI) from step 102 and the equivalent input speed equivalent input speed ($N_{I, EQ}$) from step 104, i.e., $S_G=(N_I-N_{I, EQ})$. This value may be temporarily recorded in memory 29 of FIG. 1 before proceeding to step 108.

At step 108, the TCM 28 next compares the calculated gross variator slip value ($S_G$) from step 106 to a calibrated threshold (CAL) to determine if the value of ($S_G$) exceeds the calibrated threshold (CAL) for a calibrated duration $T_X$. If so, the method 100 proceeds to step 110. Otherwise, the method 100 repeats with step 102. The predetermined duration $T_X$ may correspond to the predetermined duration ($T_D$) of FIG. 4, or it may be a different value depending on the embodiment.

At step 110, the TCM 28 may set a variator gross slip flag (F), such as a binary value or a diagnostic code, indicating a possible unacceptable level of gross slip of the variator assembly 25. The method 100 proceeds to step 112 when the variator gross slip flag has been set.

Step 112 entails executing a control action (CA) in response to the setting of the flag at step 112. Example control actions may include commanding, via the TCM 28 or other suitable controller, a change in the torque ratio of the CVT 14 of FIG. 1, e.g., a linear increase or decrease, e.g., via control of the torque generated by the engine 12, and/or an increase in clamping pressure ($F_1$ or $F_2$) to change the slip occurring across the variator assembly 25. If the slip does not respond to such control actions, the TCM 28 or ECM 26 may take other suitable actions, such as reducing the torque ratio toward or to zero to minimize the impact of excessive slip on the variator assembly 25.

While the best modes for carrying out the invention have been described in detail, those familiar with the art to which this invention relates will recognize various alternative designs and embodiments for practicing the invention within the scope of the appended claims. It is intended that all matter contained in the above description or shown in the accompanying drawings shall be interpreted as illustrative only and not as limiting.

The invention claimed is:

1. A vehicle comprising:
   an engine having an output shaft;
   drive wheels;
   a continuously variable transmission (CVT) having an input member that is selectively connected to the engine, an output member that delivers output torque to the drive wheels, and a variator assembly connecting the input member to the output member; and
   a controller having a processor and tangible, non-transitory memory on which is recorded instructions for determining a gross variator slip of the variator assembly, wherein the controller is programmed to execute the instructions via the processor to thereby:
   determine an actual input speed and an actual output speed of the variator assembly;
   calculate an equivalent input speed of the variator assembly by dividing the measured actual output speed by a calibrated variator speed ratio;
   determine the gross variator slip using the measured actual input speed and the equivalent input speed; and
   set a variator gross slip flag in the memory of the controller only when the determined gross variator slip exceeds a calibrated slip value for a predetermined duration.

2. The vehicle according to claim 1, wherein the controller is configured to execute a control action with respect to the variator assembly in response to the setting of the variator gross slip flag.

3. The vehicle according to claim 2, wherein the control action includes reducing a torque ratio of the CVT.

4. The vehicle according to claim 2, wherein the variator assembly includes pulleys and an actuator operable to apply a clamping pressure to the pulleys, and wherein the control action includes commanding an increase in the clamping pressure.

5. The vehicle according to claim 1, further comprising: a pair of speed sensors in communication with the controller, wherein the controller is configured to receive the input speed and output speed of the variator assembly from the pair of speed sensors.

6. The vehicle according to claim 1, wherein the calibrated variator speed ratio is determined via the controller using a commanded variator speed ratio determined by the controller in response to a requested shift of the CVT.

7. The vehicle according to claim 6, wherein the calibrated variator speed ratio is calculated by the controller using the commanded variator speed ratio, a current speed ratio of the variator assembly, and a calibrated change rate of the commanded variator speed ratio.

8. A continuously variable transmission (CVT) assembly comprising:
   an input member;
   an output member;
   a variator assembly connecting the input member to the output member, and including a drive pulley connected to the input member, a driven pulley connected to the output member, a drive mechanism connecting the drive pulley to the driven pulley, and at least one actuator operable to selectively apply a clamping force to one of the drive pulley and the driven pulley; and
   a controller having a processor and tangible, non-transitory memory on which is recorded instructions for determining a gross slip of the variator assembly, wherein the controller is programmed to execute the instructions to thereby:
   determine an actual input speed and an actual output speed of the variator assembly;
   calculate an equivalent input speed of the variator assembly by dividing the measured actual output speed by a calibrated variator speed ratio;
   determine the gross variator slip using the measured actual input speed and the equivalent input speed; and
   set a variator gross slip flag in the memory of the controller only when the determined gross variator slip exceeds a calibrated slip value for a predetermined duration.

9. The CVT assembly according to claim 8, wherein the controller is configured to change the clamping force in response to the setting of the gross slip flag.

10. The CVT assembly according to claim 9, wherein the change of clamping force includes reducing a torque ratio of the CVT.

11. The CVT assembly according to claim 9, wherein the change of clamping force includes increasing the clamping pressure.

12. The CVT assembly according to claim 8, further comprising: an input speed sensor and an output speed sensor each in communication with the controller, wherein the controller is configured to receive the input speed and output speed of the variator assembly from the respective input and output speed sensors.

13. The CVT assembly of claim 8, wherein the drive mechanism is selected from the group consisting essentially of: a belt and a chain.

14. A method comprising:
    determining, via a controller of a vehicle having a continuously variable transmission (CVT), an actual input speed and an actual output speed of a variator assembly of the CVT;
    calculating an equivalent input speed of the variator assembly by dividing the measured actual output speed by a calibrated variator speed ratio;
    determining the gross variator slip using the measured actual input speed and the equivalent input speed; and
    setting a variator gross slip flag in the memory of the controller only when the determined gross variator slip exceeds a calibrated slip value for a predetermined duration.

15. The method according to claim 14, further comprising: changing a clamping pressure of an actuator of the variator assembly via the controller in response to the setting of the gross slip flag.

16. The method according to claim 14, wherein determining an actual input speed and an actual output speed of a variator assembly of the CVT includes directly measuring the input and output speeds via a respective input sensor and output sensor.

17. The method according to claim 14, further comprising:
    determining, via the controller, a commanded variator speed ratio in response to a requested ratio change of the CVT; and determining the calibrated variator speed ratio using the commanded variator speed ratio.

18. The method according to claim 17, further comprising: calculating the calibrated variator speed ratio using the commanded variator speed ratio, a current speed ratio of the variator assembly, and a calibrated change rate of the commanded variator speed ratio.

19. The method according to claim 14, further comprising: reducing a torque ratio of the CVT in response to setting the variator gross slip flag.

20. The method according to claim 14, further comprising: increasing a clamping pressure to one of a drive and driven pulley of the variator assembly in response to setting the variator gross slip flag.

* * * * *